(12) United States Patent
Bae et al.

(10) Patent No.: US 10,903,481 B2
(45) Date of Patent: Jan. 26, 2021

(54) ELECTRODE, ELECTRODE ASSEMBLY AND SECONDARY BATTERY CONTAINING THE SAME

(71) Applicant: LG Chem, Ltd., Seoul (KR)

(72) Inventors: Sung Hoon Bae, Daejeon (KR); Seung Cheol Kim, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 16/597,391

(22) Filed: Oct. 9, 2019

(65) Prior Publication Data
US 2020/0119330 A1    Apr. 16, 2020

(30) Foreign Application Priority Data
Oct. 11, 2018 (KR) .................... 10-2018-0121391

(51) Int. Cl.
*H01M 4/04* (2006.01)
*H01M 2/16* (2006.01)

(52) U.S. Cl.
CPC ......... *H01M 4/045* (2013.01); *H01M 2/1673* (2013.01)

(58) Field of Classification Search
None
See application file for complete search history.

(56) References Cited

U.S. PATENT DOCUMENTS

2012/0237809 A1* 9/2012 Ahn ................. H01M 10/0587
                                                                                429/94
2018/0337392 A1   11/2018 Lee et al.

FOREIGN PATENT DOCUMENTS

| JP | 2008108477 A | * | 5/2008 | ............. H01M 2/22 |
|----|--------------|---|--------|---------------------|
| JP | 2014029880 A |   | 2/2014 |                     |
| KR | 19980036680 A |   | 8/1998 |                     |
| KR | 20000065707 A |   | 11/2000 |                    |
| KR | 20020088469 A | * | 11/2002 |                    |
| KR | 20020088469 A |   | 11/2002 |                    |
| KR | 20100018865 A |   | 2/2010 |                     |
| KR | 100958649 B1 |   | 5/2010 |                     |
| KR | 20150040437 A |   | 4/2015 |                     |
| KR | 20160137429 A |   | 11/2016 |                    |
| KR | 20170014476 A | * | 2/2017 | ........ H01M 10/0583 |
| KR | 20170019145 A |   | 2/2017 |                     |
| KR | 20180004588 A |   | 1/2018 |                     |

* cited by examiner

*Primary Examiner* — Daniel S Gatewood
(74) *Attorney, Agent, or Firm* — Lerner, David, Littenberg, Krumholz & Mentlik, LLP

(57) ABSTRACT

An electrode assembly includes first and second electrodes stacked in a stacking direction with a separator therebetween. The first electrode includes a first coating portion coated with a first electrode active material and a first non-coating portion at a side of the first coating portion without being coated with the first electrode active material, and the second electrode includes a second coating portion coated with a second electrode active material and a second non-coating portion at a side of the second coating portion without being coated with the second electrode active material. The first non-coating portion and the second non-coating portion are not overlapped in the stacking direction.

17 Claims, 18 Drawing Sheets

| CLASSIFICATION | START | | | END | | | RESULT | | |
|---|---|---|---|---|---|---|---|---|---|
| | FIRST NON-COATING PORTION | COATING PORTION | SECOND NON-COATING PORTION | FIRST NON-COATING PORTION | COATING PORTION | SECOND NON-COATING PORTION | FIRST NON-COATING PORTION | COATING PORTION | SECOND NON-COATING PORTION |
| MANUFACTURING EXAMPLE 1 | 25.66°C | 25.74°C | 25.53°C | 28.48°C | 30.03°C | 27.49°C | 2.82°C | 4.29°C | 1.96°C |
| COMPARATIVE EXAMPLE 1 | 24.83°C | 24.78°C | 24.80°C | 30.60°C | 30.08°C | 28.64°C | 5.77°C | 5.3°C | 3.84°C |

FIG.18

ELECTRODE, ELECTRODE ASSEMBLY AND SECONDARY BATTERY CONTAINING THE SAME

CROSS-REFERENCE TO RELATED APPLICATIONS

This application claims the priority of Korean Patent Application No. 10-2018-0121391, filed on Oct. 11, 2018, in the Korean Intellectual Property Office, the disclosure of which is incorporated herein by reference.

BACKGROUND OF THE INVENTION

Field of the Invention

The present invention relates to an electrode, an electrode assembly and a secondary battery comprising the same, and more particularly, to an electrode, in which a non-coating portion that is an electrode tab is capable of being largely secured, an electrode assembly and a secondary battery comprising the same.

Description of the Related Art

In general, secondary batteries refer to chargeable and dischargeable batteries, unlike primary batteries that are not chargeable. Such a secondary battery is being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly in which an electrode and a separator are alternately stacked, an electrolyte, and a pouch accommodating the electrode assembly and the electrolyte.

Also, the electrode assembly comprises a plurality of electrode and a separator disposed between the plurality of electrodes, and an electrode tab is provided on the electrode.

However, the electrode tab has an area less than that of the electrode. Thus, the electrode tab has high resistance and large heat generation to deteriorate performance of the battery.

SUMMARY OF THE INVENTION

An aspect of the present invention provides an electrode in which a non-coating portion increases in area to reduce resistance and heat, which are generated in the non-coating portion, thereby significantly improving performance of a battery, an electrode assembly and a secondary battery comprising the same.

According to an aspect of the present invention, there is provided an electrode comprising: a coating portion coated with an electrode active material; and a non-coating portion at one side of the coating portion without being coated with the electrode active material.

According to another aspect of the present invention, there is provided an electrode assembly comprising first and second electrodes stacked in a stacking direction with a separator therebetween, wherein the first electrode comprises a first coating portion coated with a first electrode active material and a first non-coating portion at a side of the first coating portion without being coated with the first electrode active material, and the second electrode comprises a second coating portion coated with a second electrode active material and a second non-coating portion at aside of the second coating portion without being coated with the second electrode active material, wherein the first non-coating portion and the second non-coating portion are not overlapped in the stacking direction.

In one variation of this aspect, the first coating portion may have a circular shape and the first non-coating portion may have an arc shape with a thickness, and the second coating portion may have a circular shape and the second non-coating portion may have an arc shape with a thickness.

Each of the first non-coating portion and the second non-coating portion may have an arc angle of 90° or more.

The arc length of each of the first non-coating portion and the second non-coating portion may be 170° or less.

The first non-coating portion and the second non-coating portion may have the same arc angle.

According to another aspect of the present invention, there is provided a secondary battery comprising: the aforementioned electrode assembly; a case configured to accommodate the electrode assembly; and a lead member comprising a first lead coupled to the first non-coating portion provided in the first electrode and having an end led out of the case and a second lead coupled to the second non-coating portion provided in the second electrode and having an end led out of the case.

The first non-coating portion and a coupling surface of the first lead may have the same arc angle, and the second non-coating portion and a coupling surface of the second lead may have the same arc angle.

A blocking part configured to block the first non-coating portion and the second non-coating portion so that the first non-coating portion and the second non-coating portion do not contact each other may be disposed between an end of the first non-coating portion and an end of the second non-coating portion.

The end of the first non-coating portion and the end of the second non-coating portion may be fixed to opposing surfaces of the blocking part, respectively.

The blocking part may be made of a semiconductor material, and the semiconductor material may have an insulating property at a temperature less than a set temperature to block connection between the end of the first non-coating portion and the end of the second non-coating portion and be changed into a conductor at a temperature greater than the set temperature to allow current to flow through the end of the first non-coating portion and the end of the second non-coating portion.

The set temperature may range from 60° C. to 80° C.

In another variation of this aspect, the first non-coating portion may be ⊏-shaped and may be disposed on an end at the side of the first coating portion and both side ends of the first coating portion contacting the end, and the second non-coating portion may be ⊏-shaped and may be disposed on an end at the side of the second coating portion and both side ends of the second coating portion contacting the end of the second coating portion.

The first non-coating portion and the second non-coating portion may have the same size.

According to another aspect of the present invention, there is provided a secondary battery comprising: the aforementioned electrode assembly; a case configured to accommodate the electrode assembly; and a lead member comprising a first lead coupled to the first non-coating portion provided in the first electrode and having an end led out of the case and a second lead coupled to the second non-coating portion provided in the second electrode and having an end led out of the case.

The first non-coating portion and a coupling surface of the first lead, which are coupled to each other, may have the same '⊏' shape, and the second non-coating portion and a coupling surface of the second lead, which are coupled to each other, may have the same '⊏' shape.

A blocking part configured to block the first non-coating portion and the second non-coating portion so that the first non-coating portion and the second non-coating portion do not contact each other may be disposed between the end of the first non-coating portion and the end of the second non-coating portion.

The end of the first non-coating portion and the end of the second non-coating portion may be fixed to both opposing surfaces of the blocking part, respectively.

The blocking part may be made of a semiconductor material, and the semiconductor material may have an insulating property at a temperature less than a set temperature to block connection between the end of the first non-coating portion and the end of the second non-coating portion and may be changed into a conductor at a temperature greater than the set temperature to allow current to flow through the end of the first non-coating portion and the end of the second non-coating portion.

BRIEF DESCRIPTION OF THE DRAWINGS

The above and other aspects, features and other advantages of the present invention will be more clearly understood from the following detailed description taken in conjunction with the accompanying drawings, in which:

FIG. 18 is a graph illustrating experimental results according to the present invention.

DETAILED DESCRIPTION OF THE PREFERRED EMBODIMENT

Figure 1:
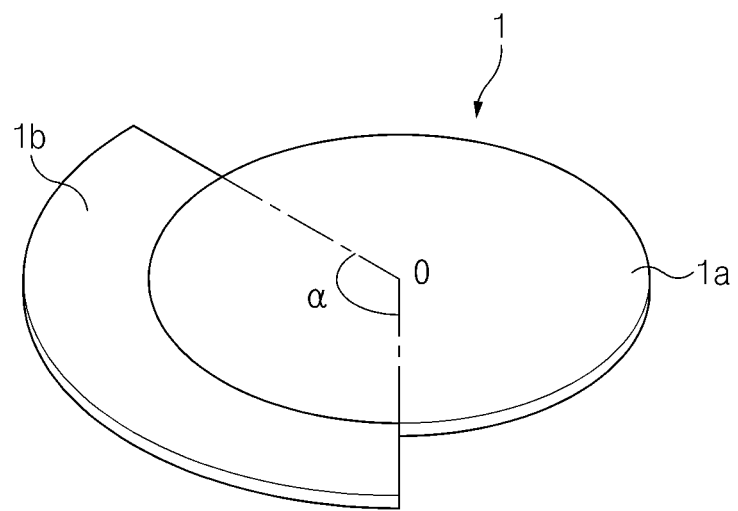
FIG. 1 is a perspective view of an electrode according to an embodiment of a first invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[First Invention]

Electrode According to an Embodiment of First Invention

An electrode 1 according to an embodiment of a first invention comprises an arc-shaped non-coating portion to significantly increase an area of the non-coating portion.

For example, as illustrated in FIG. 1, the electrode 1 according to an embodiment of the first invention comprises a coating portion 1a having a circular shape and coated with an electrode active material and a non-coating portion 1b having an arc shape with a thickness at one side of the coating portion 1a without being coated with the electrode active material. That is, since the electrode 1 comprises the non-coating portion having the arc shape, the non-coating portion 1b may increase in area. Particularly, an area connected between the coating portion 1a and the non-coating portion 1b may increase to effectively disperse resistance and heat, thereby reducing resistance and heat, which are generated in the non-coating portion 1b.

Also, the electrode 1 may significantly increase in area connected between the coating portion 1a and the non-coating portion 1b to effectively disperse stress generated at the connected portion between the coating portion 1a and the non-coating portion 1b, thereby preventing the non-coating portion 1b from being damaged.

The non-coating portion 1b has an arc angle of about 90° or more with respect to a center point O of the coating portion 1a. That is, when the non-coating portion 1b has an arc angle of about 90° or more, the non-coating portion 1b may be connected to an outer circumferential surface of about ¼ or more of the coating portion 1a to effectively increase in connectivity with the coating portion 1a.

The non-coating portion 1b has an arc angle of about 170° or less with respect to the center point of the coating portion 1a. That is, when first and second electrodes having different polarities are alternately stacked, first and second non-coating portions, which are provided in the first and second electrodes, may be disposed in directions opposite to each other with respect to the stacking direction of the electrodes. Here, when each of the first and second non-coating portions has an arc angle of about 180° or more, the first and second non-coating portions may contact each other to cause short circuit. In particular, when the first and second electrodes are alternately stacked, since meandering defects occur, it is necessary to secure a predetermined space. Thus, the non-coating portion 1b may have an arc angle of about 170° with respect to the center point of the coating portion 1a to prevent the short circuit from occurring.

Therefore, the electrode 1 according to an embodiment of the first invention may comprise the circular coating portion 1a and the arc-shaped non-coating portion 1b to significantly increase an area of the non-coating portion 1b, thereby effectively reducing the resistance and heat, which are generated in the non-coating portion 1b, and improving performance of the electrode.

Although the circular coating portion 1a has been described as one embodiment in the present invention, the coating portion 1a may have a polygonal shape such as an oval shape, an arc shape, and the like according to the application technology.

Although the non-coating portion 1b having a bow pattern shape has been described as one embodiment in the present invention, the non-coating portion may have various shapes as long as one portion of the non-coating portion is connected to the circular coating portion 1a.

Figure 2:
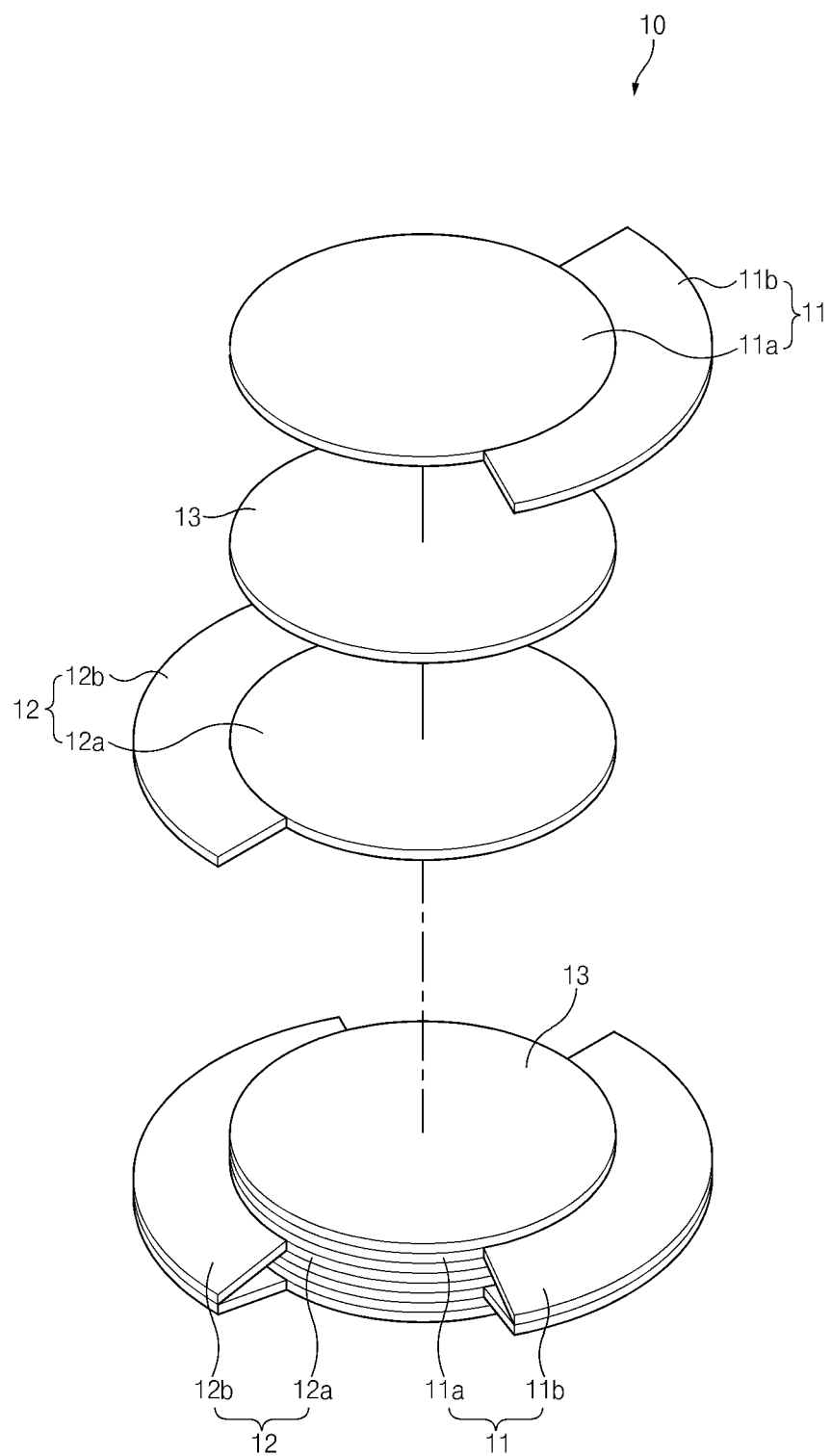
FIG. 2 is a perspective view of an electrode assembly according to another embodiment of the first invention.
Figure 3:
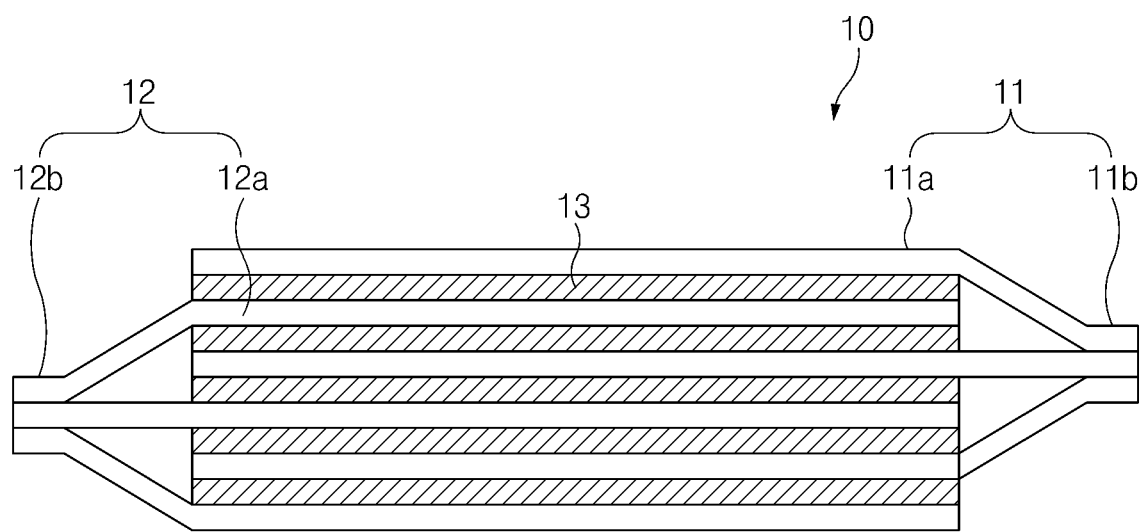
FIG. 3 is a cross-sectional view of the electrode assembly according to another embodiment of the first invention.

Referring to FIG. 2, the electrode 1 may comprise a first electrode 11 and a second electrode 12 according to polarity. Here, the first electrode 11 may be a positive electrode, and the second electrode 12 may be a negative electrode.

Electrode Assembly According to Another Embodiment of First Invention

An electrode assembly 10 according to another embodiment of the first invention comprises the electrode according to the foregoing embodiment.

For example, as illustrated in FIGS. 2 to 5, the electrode assembly 10 according to another embodiment of the first invention comprises first and second electrodes 11 and 12, which are stacked with a separator 13 therebetween.

Figure 4:
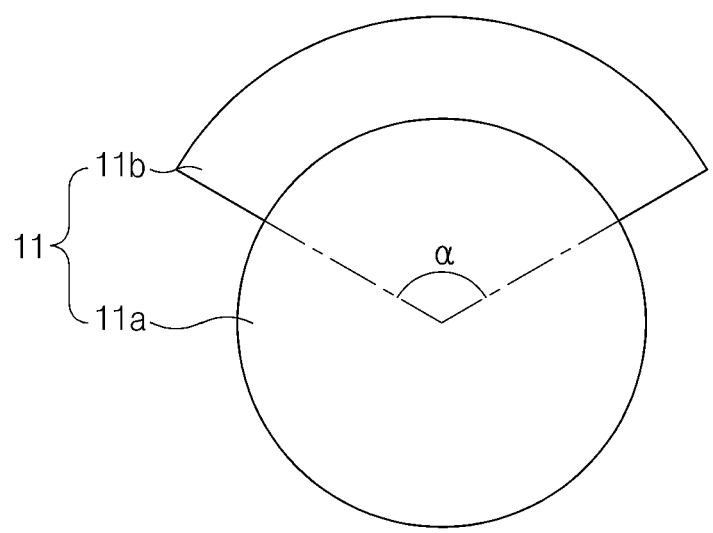
FIG. 4 is a plan view illustrating a first electrode of the electrode assembly according to another embodiment of the first invention.

Referring to FIG. 4, the first electrode 11 comprises a first coating portion 11a having a circular shape and coated with an electrode active material and a first non-coating portion 11b having an arc shape with a thickness at one side of the first coating portion 11a without being coated with the electrode active material. That is, the first electrode 11 may comprise the arc-shaped first non-coating portion 11b on an outer circumferential surface of the circular first coating portion 11a to increase in area of the first non-coating portion 11b.

Figure 5:
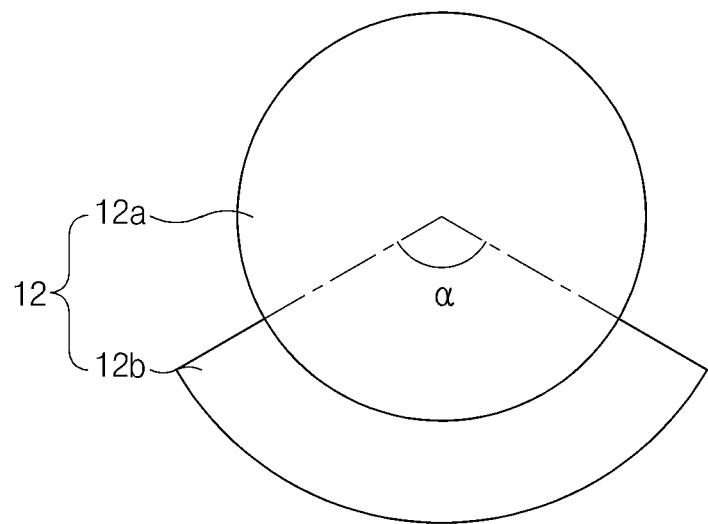
FIG. 5 is a plan view illustrating a second electrode of the electrode assembly according to another embodiment of the first invention.

Referring to FIG. 5, the second electrode 12 comprises a second coating portion 12a having a circular shape and coated with the electrode active material and a second non-coating portion 12b having an arc shape with a thickness at the other side of the second coating portion 12a without being coated with the electrode active material. That is, in the second electrode 12, the circular second coating portion 12a may be provided in a circular shape, and the second non-coating portion 12b may be provided in an arc shape on an outer circumferential surface of the second coating portion 12a having the circular shape to provide the second non-coating portion 12b with respect a center point of the second coating portion 12a, thereby increasing in area of the second non-coating portion 12b.

Here, the first electrode 11 and the second electrode 12 have the same shape to improve efficiency in manufacturing and stacking.

Each of the first non-coating portion 11b and the second non-coating portion 12b has an arc angle α of about 90° or more to effectively improve connectivity with the coating portion 1a. Also, each of the first non-coating portion 11b and the second non-coating portion 12b has an arc angle of about 170° or less to effectively prevent an end of the first non-coating portion 11b and an end of the second non-coating portion 12b from contact each other, thereby preventing short circuit from occurring.

The separator 13 is disposed between the first coating portion 11a of the first electrode 11 and the second coating portion 12a of the second electrode 12 and has a circular shape. In particular, the separator 13 has a circular shape larger than each of the first coating portion 11a and the second coating portion 12a to prevent the first coating portion 11a and the second coating portion 12a from contacting each other.

Thus, the electrode assembly 10 according to another embodiment of the first invention may comprise the first and second electrodes 11 and 12, which are provided with the arc-shaped first and second non-coating portions 11b and 12b, to secure a larger area of each of the first and second non-coating portions 11b and 12b, thereby effectively reducing resistance and heat, which are generated in the first and second non-coating portions 11b and 12b, and improving performance of the electrode assembly. In particular, each of boundary lines (or connecting lines) between the first coating portion 11a and the first non-coating portion 11b and between the second coating portion 12a and the second non-coating portion 12b may be provided as a curved line to improve the connectivity.

Secondary Battery According to Still Another Embodiment of First Invention

A secondary battery 100 according to still another embodiment of the first invention comprises the electrode assembly according to the foregoing embodiment.

Figure 6:
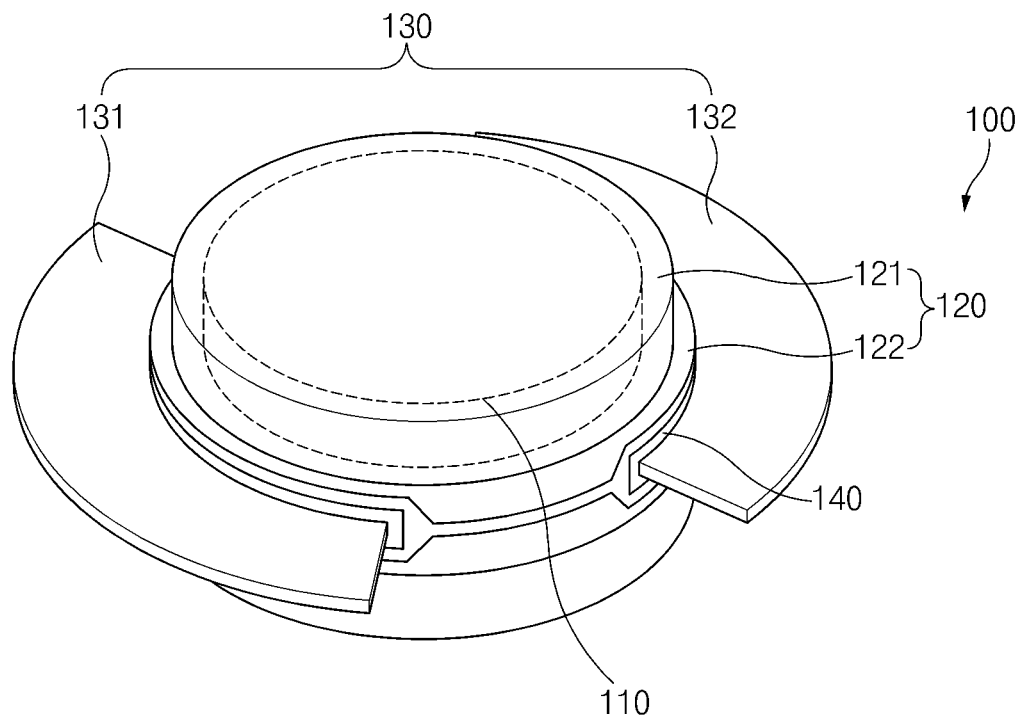
FIG. 6 is a perspective view of a secondary battery according to still another embodiment of the first invention.
Figure 7:
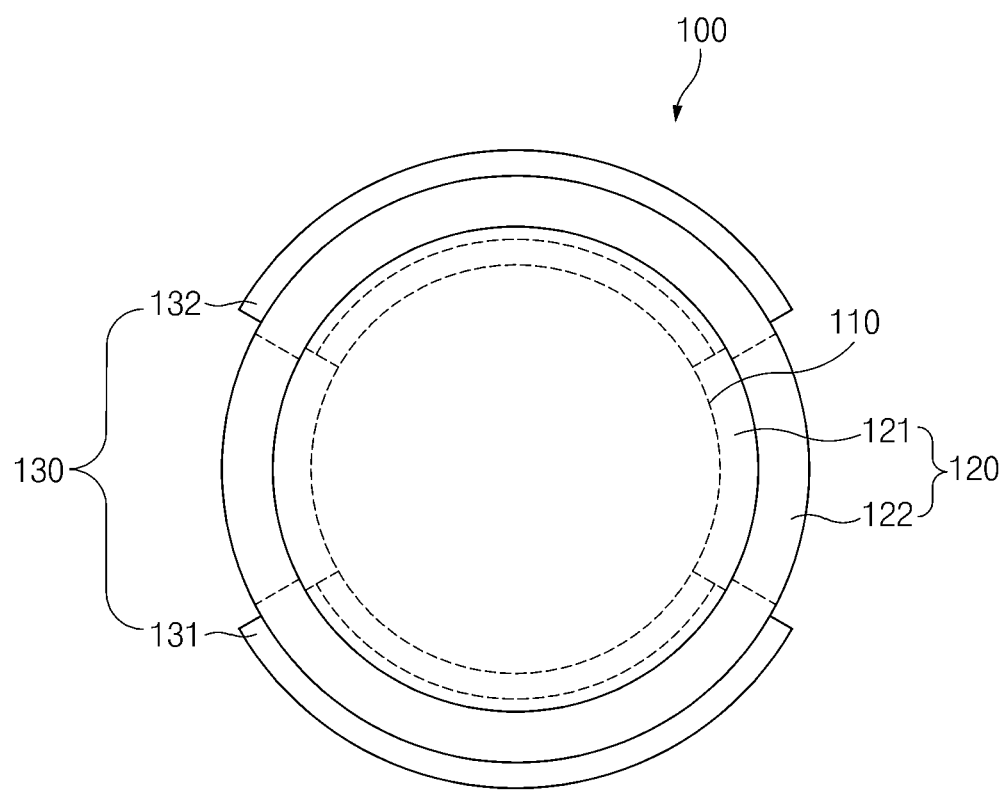
FIG. 7 is a plan view of the secondary battery according to still another embodiment of the first invention.
Figure 8:
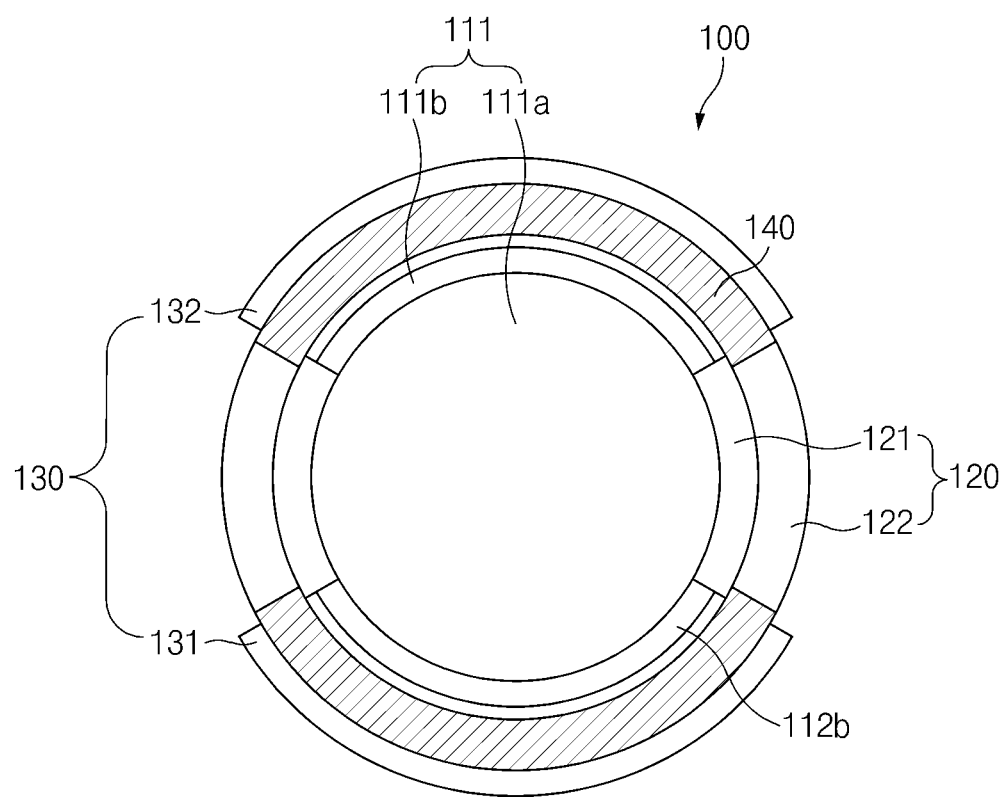
FIG. 8 is a partial cross-sectional plan view of the secondary battery according to still another embodiment of the first invention.

For example, as illustrated in FIGS. 6 to 8, the secondary battery 100 according to still another embodiment of the first invention comprises an electrode assembly 110, a case 120, and a lead member 130.

The electrode assembly 110 comprises first and second electrodes 111 and 112, which are stacked with a separator 113 therebetween. The first electrode 111 comprises a first coating portion 111a having a circular shape and coated with an electrode active material and a first non-coating portion having an arc shape with a thickness at one side of the first coating portion 111a without being coated with the electrode active material. Also, the second electrode 112 comprises a second coating portion 112a having a circular shape and coated with the electrode active material and a second non-coating portion 112b having an arc shape with a thickness at the other side of the second coating portion 112a without being coated with the electrode active material. Also, the separator 113 has a circular shape larger than each of the first and second coating portions 111a and 112a.

The electrode assembly 110 has the same configuration as the electrode assembly 10 described in the foregoing another embodiment, and thus, a detailed description thereof will be omitted.

As described above, the electrode assembly 110 may comprise the arc-shaped first and second non-coating portions 111b and 112b to significantly secure an area of each of the first and second non-coating portions 111b and 112b.

The case 120 is configured to accommodate the electrode assembly 110 and comprises an accommodation part 121 having a circular shape that is capable of accommodating the electrode assembly 110 and a sealing part 122 disposed along an edge surface of the accommodation part 121 to seal the accommodation part 121.

The lead member 130 comprises a first lead 131 coupled to the first non-coating portion 111b provided in the first electrode 111 and having an end led out of the case 120 and a second lead 132 coupled to the second non-coating portion 112b provided in the second electrode 112 and having an end led out of the case 120.

Figure 9:
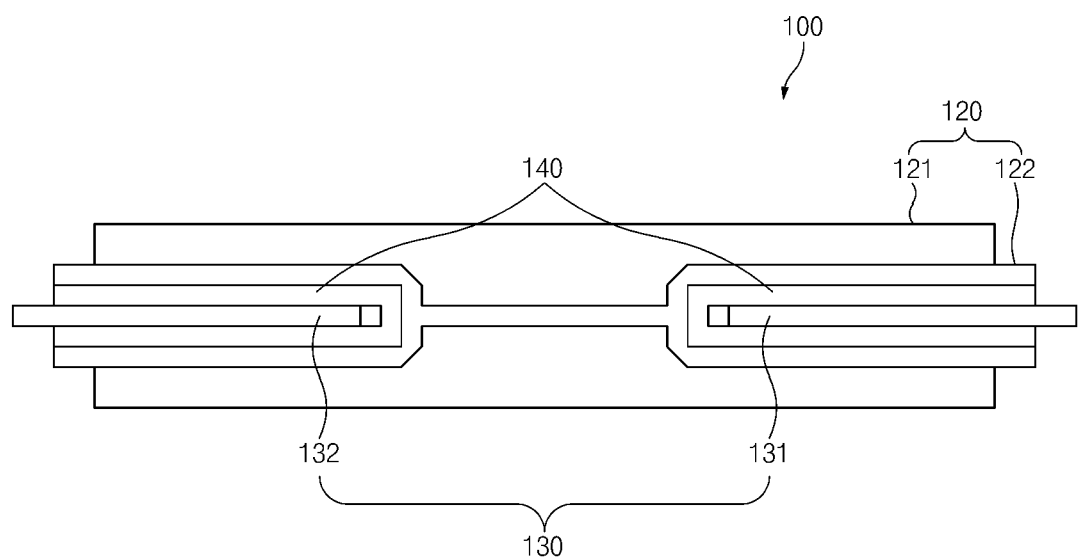
FIG. 9 is a side view of the secondary battery according to still another embodiment of the first invention.

Here, as illustrated in FIG. 9, each of the first lead 131 and the second lead 132 may have the same arc shape as each of the first non-coating portion 111b and the second non-coating portion 112b to improve coupling force between the first lead 131 and the first non-coating portion 111b and between the second lid 132 and the second non-coating portion 112b. In particular, an area of each of the first lead 131 and the second lead 132 may be significantly secured to significantly reduce resistance and heat, which are generated in the first lead 131 and the second lead 132, thereby improving performance of the battery.

In summary, the first lead 131 has the same arc angle as the first non-coating portion 111b, and the second lead 132 has the same arc angle as the second non-coating portion 112b.

Figure 10:
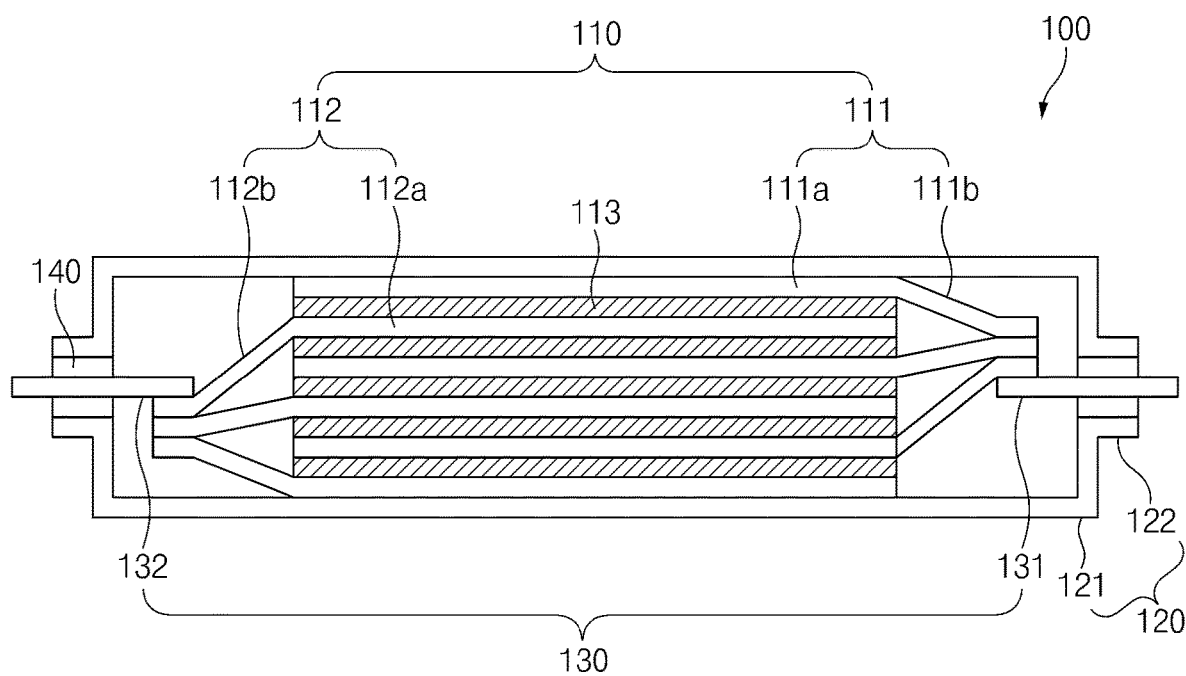
FIG. 10 is a cross-sectional view of the secondary battery according to still another embodiment of the first invention.

As illustrated in FIG. 10, a lead film 140 for enhancing sealing force is further provided between the sealing part 122 of the case 120 and the lead member 130. That is, the lead film 140 may be disposed between the sealing part 122 of the case 120 and each of the first and second leads 131 and 132 to perform sealing between the sealing part 122 of the case 120 and each of the first and second leads 131 and 132.

In particular, the lead film 140 may have the same arc shape as each of the first and second leads 131 and 132 to stably perform the sealing between the sealing part 122 of the case 120 and each of the first and second leads 131 and 132.

Thus, in the secondary battery 100 according to still another embodiment of the first invention, each of the first non-coating portion 111b of the first electrode 111, the second non-coating portion 112b of the second electrode 112, the first lead 131, and the second lead 132 may have the arc shape. As a result, an area of each of the first non-coating portion 111b, the second non-coating portion 112b, the first lead 131, and the second lead 132 may be significantly secured to reduce resistance and heat, which are generated in the first non-coating portion 111b, the second non-coating portion 112b, the first lead 131, and the second lead 132, thereby improving performance of the secondary battery.

Hereinafter, in description of other inventions, similar components are used for similar components to those of the first invention described above, and duplicated descriptions thereof will be omitted.

[Second Invention]

Electrode According to an Embodiment of Second Invention

An electrode 2 according to an embodiment of a second invention comprises a '⊏'-shaped non-coating portion to significantly increase an area of the non-coating portion.

Figure 11:
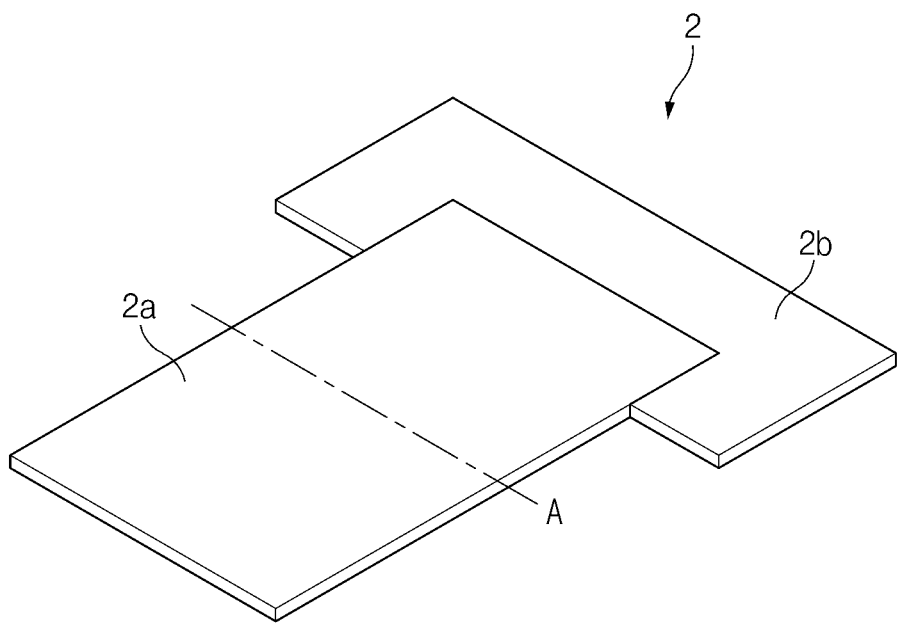
FIG. 11 is a perspective view of an electrode according to an embodiment of a second invention.

For example, as illustrated in FIG. 11, an electrode 2 according to an embodiment of the second invention comprises a coating portion 2a coated with an electrode active material and having a rectangular shape and a ⊏-shaped non-coating portion 2b disposed on an end of one side of the coating portion 2a (a rear surface of the coating portion when viewed in FIG. 11) and both side ends of the coating portion contacting the end (both side surfaces of the coating portion when viewed in FIG. 11).

Here, an end of the non-coating portion 2b is spaced a predetermined length from a center line A that equally divides a length of the coating portion 2a. That is, when first and second electrodes having different polarities are alternately stacked, first and second non-coating portions, which are provided in the first and second electrodes, may be disposed in directions opposite to each other. Here, when each of the first and second non-coating portions are disposed beyond the center line, the ends of the first and second non-coating portions may contact each other to cause short circuit. Here, the end of the non-coating portion 2b is spaced a predetermined length from the center line A that equally divides the length of the coating portion 2a.

Therefore, the electrode 2 according to an embodiment of the second invention may comprise the ⊏-shaped non-coating portion 2b to significantly increase in area of the non-coating portion 2b, thereby effectively reducing resistance and heat, which are generated in the non-coating portion 2b.

Figure 12:
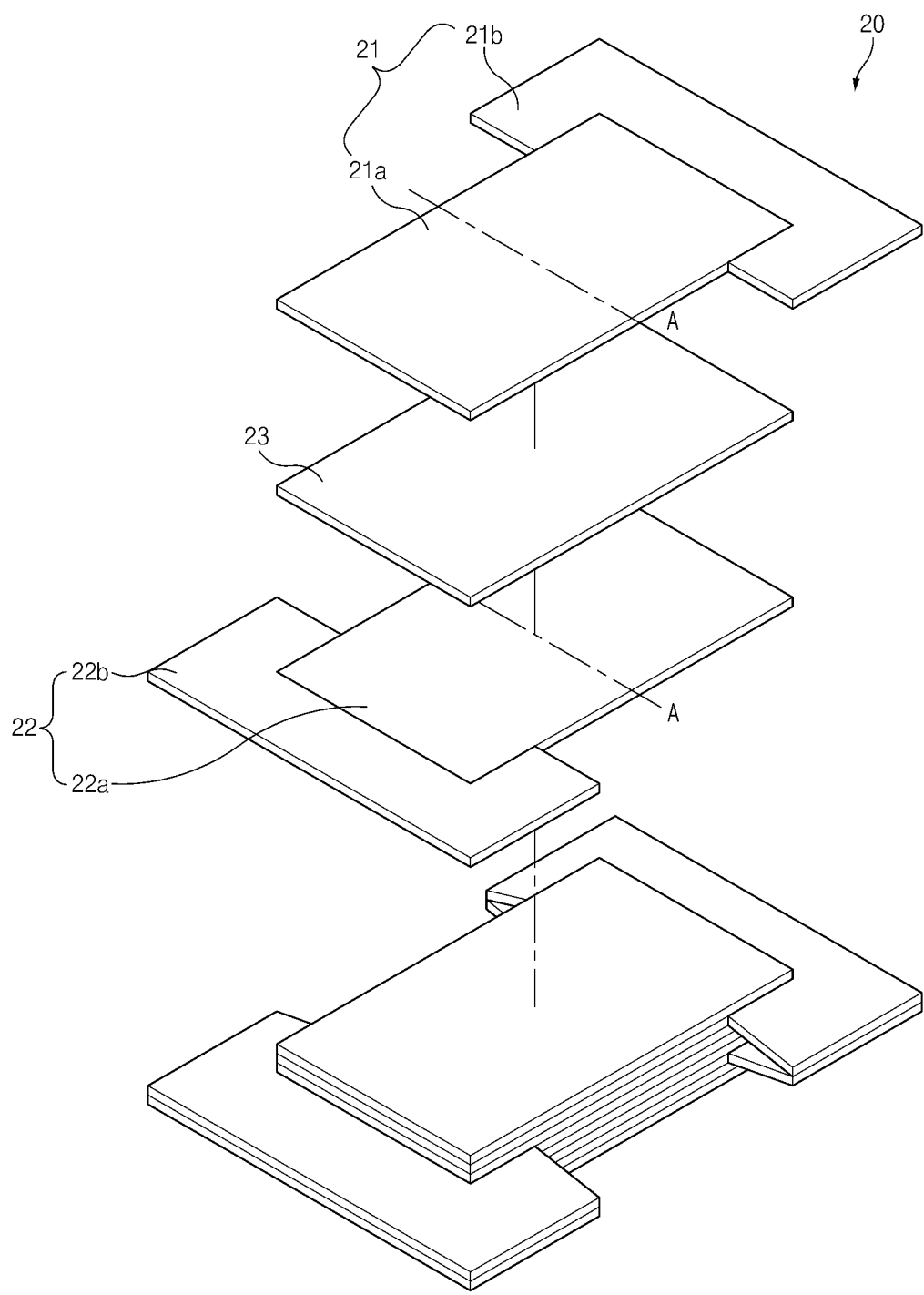
FIG. 12 is a perspective view of an electrode assembly according to another embodiment of the second invention.

Referring to FIG. 12, the electrode 2 may comprise a first electrode 21 and a second electrode 22. Here, the first electrode 21 may be a positive electrode, and the second electrode 22 may be a negative electrode.

Electrode Assembly According to Another Embodiment of Second Invention

An electrode assembly 20 according to another embodiment of the second invention comprises the electrode according to the foregoing embodiment.

Figure 13:
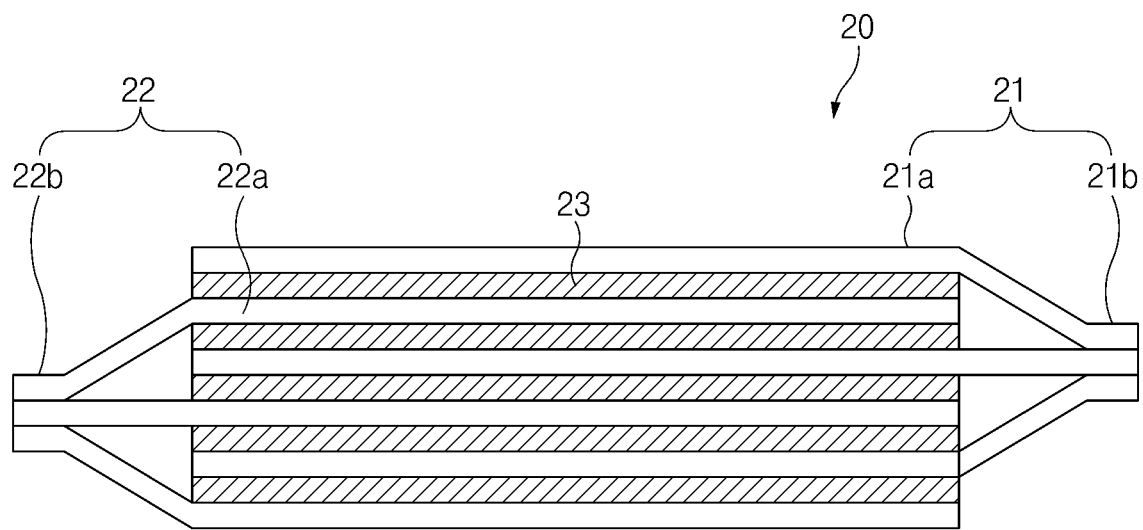
FIG. 13 is a cross-sectional view of the electrode assembly according to another embodiment of the second invention.

For example, as illustrated in FIGS. 12 to 13, the electrode assembly 20 according to another embodiment of the second invention comprises first and second electrodes 21 and 22, which are stacked with a separator 23 therebetween.

The first electrode 21 comprises a first coating portion 21a coated with an electrode active material and a ⊏-shaped first non-coating portion 21b disposed on an end of one side of the coating portion 21a and both side ends of the first coating portion 21a contacting the end. Also, the second electrode 22 comprises a second coating portion 22a coated with the electrode active material and a ⊏-shaped second non-coating portion 22b disposed on an end of one side of the second coating portion 22a and both side ends of the second coating portion 22a contacting the end.

Here, the ends of the first non-coating portion 21b and the second non-coating portion 22b, which are directed in directions opposite to each other, may be provided so as not to overlap each other. That is, the ends of the first and second non-coating portions 21b and 22b may be provided so as not to be beyond a center line A that equally divides each of the first and second coating portions 21a and 22a. As a result, in a state in which the first non-coating portion 21b and the second non-coating portion 22b are directed in directions opposite to each other, even though the first and second electrodes 21 and 22 are alternately stacked, the first non-coating portion 21b and the second non-coating portion 22b may be prevented from contacting each other.

Thus, the electrode assembly 20 according to another embodiment of the second invention may comprise the electrodes 21b and 22b, which are provided with the ⊏-shaped first and second non-coating portions 21b and 22b, to increase in area of each of the first and second non-coating portions 21b and 22b, thereby effectively reducing resistance and heat, which are generated in the first and second non-coating portions 21b and 22b, and improving performance of the electrode assembly.

Secondary Battery According to Still Another Embodiment of Second Invention

A secondary battery 200 according to still another embodiment of the second invention comprises the electrode assembly according to the foregoing embodiment.

Figure 14:
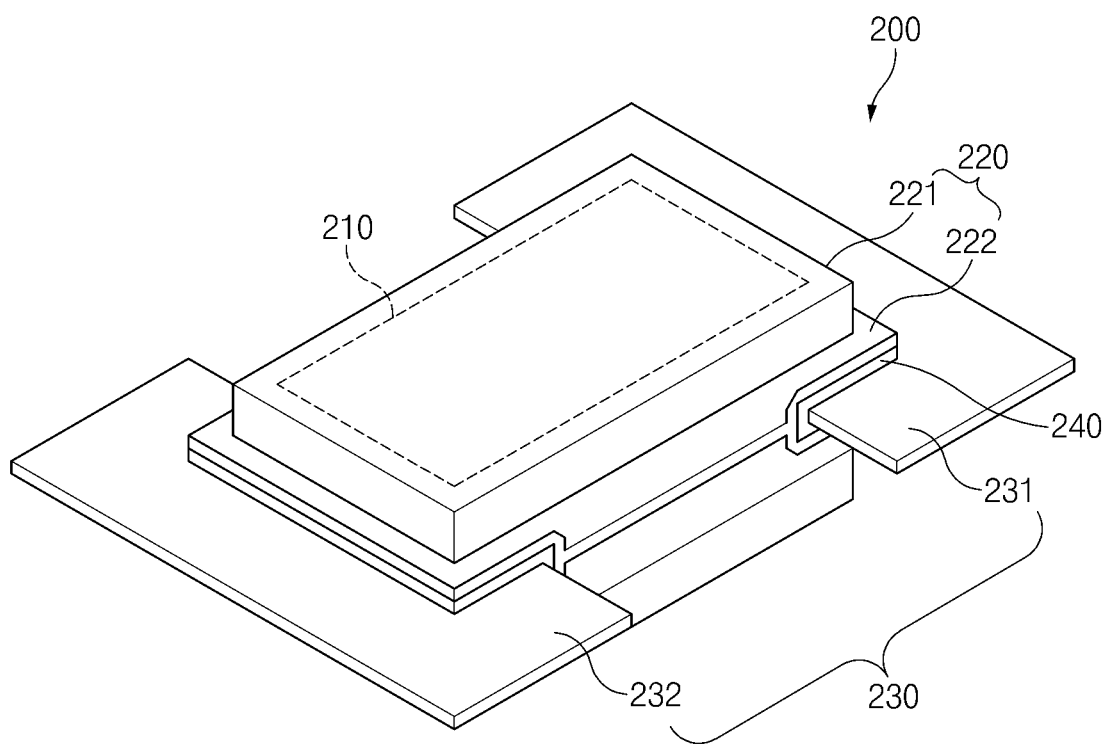
FIG. 14 is a perspective view of a secondary battery according to still another embodiment of the second invention.
Figure 15:
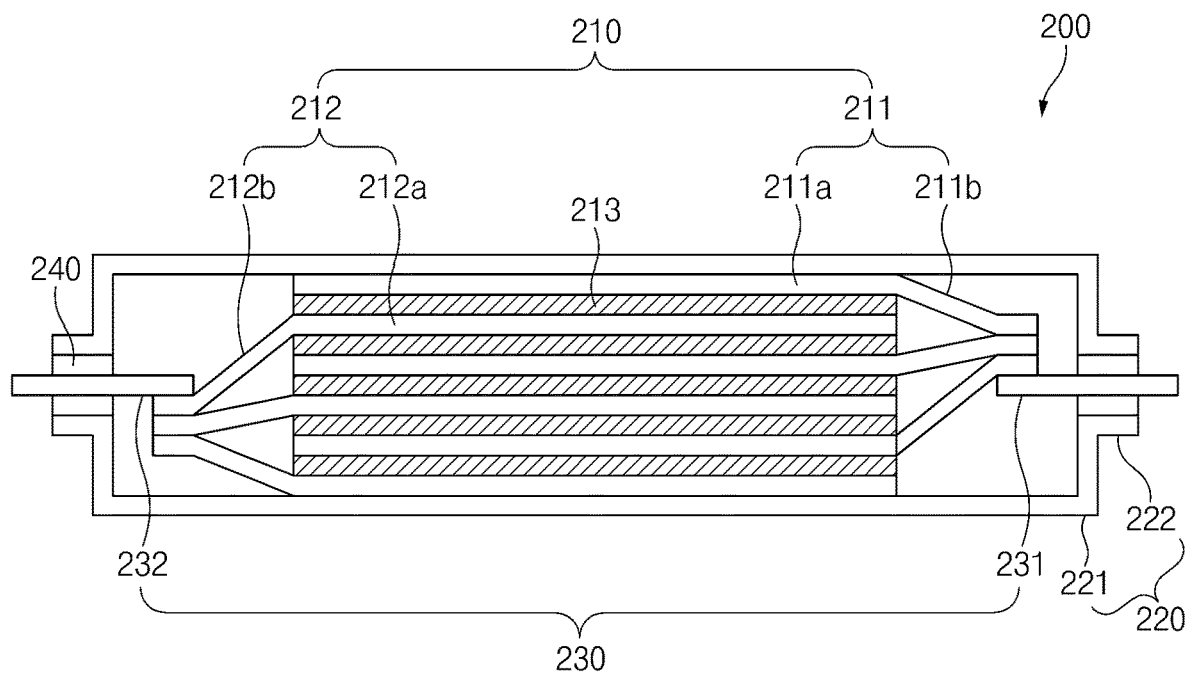
FIG. 15 is a cross-sectional view of the secondary battery according to still another embodiment of the second invention.

As illustrated in FIGS. 14 and 15, the secondary battery 200 according to the still another embodiment of the second invention comprises an electrode assembly 210, a case 220, and a lead member 230.

The electrode assembly 210 comprises first and second electrodes 211 and 212, which are stacked with a separator 213 therebetween. The first electrode 211 comprises a first coating portion 211a coated with an electrode active material and a ⊏-shaped first non-coating portion 211b disposed on an end of one side of the first coating portion 211a and both side ends of the first coating portion 211a contacting the end, and the second electrode 212 comprises a second coating portion 212a coated with the electrode active material and a ⊏-shaped second non-coating portion 212b disposed on an end of the other side of the second coating portion 212a and both side ends of the second coating portion 212a contacting the end.

Here, the ends of the first non-coating portion 211b and the second non-coating portion 212b, which are directed in directions opposite to each other, may be provided so as not to overlap each other. Thus, short circuit that occurs when the first non-coating portion 211b and the second non-coating portion 212b contact each other may be prevented.

The electrode assembly 210 has the same configuration as the electrode assembly 20 according to the foregoing another embodiment, and thus, a detailed description thereof will be omitted.

The case 220 is configured to accommodate the electrode assembly 210 and comprises an accommodation part 221 accommodating the electrode assembly 210 and a sealing part 222 sealing the accommodation part 221.

The lead member 230 comprises a first lead 231 coupled to the first non-coating portion 211b of the first electrode 211 and having an end led out of the case 220 and a second lead 232 coupled to the second non-coating portion 212b of the second electrode 212 and having an end led out of the case 220.

Here, each of the first lead 231 and the second lead 232 may have a '⊏' shape that is similar to that of each of the first non-coating portion 211b and the second non-coating portion 212b. As a result, coupling areas between the first lead 231 and the first non-coating portion 211b and between the second lead 232 and the second non-coating portion 212b may increase to reduce resistance and heat, which are generated in the first lead 231 and the second lead 232.

A lead film 240 for enhancing sealing force is further provided between the sealing part 222 of the case 220 and the lead member 230. That is, the lead film 240 may be disposed between the sealing part 222 of the case 220 and each of the first and second leads 231 and 232 to perform sealing between the sealing part 222 of the case 220 and each of the first and second leads 231 and 232.

In particular, the lead film 240 may have the same '⊏' shape as each of the first and second leads 231 and 232 to stably perform the sealing between the sealing part 222 of the case 220 and each of the first and second leads 231 and 232.

Thus, in the secondary battery 200 according to still another embodiment of the second invention, each of the first non-coating portion 211b of the first electrode 211, the second non-coating portion 212b of the second electrode 212, the first lead 231, and the second lead 232 may have the '⊏' shape. As a result, an area of each of the first non-coating portion 211b, the second non-coating portion 212b, the first lead 231, and the second lead 232 may be significantly secured to reduce the resistance and heat, which are generated in the first non-coating portion 211b, the second non-coating portion 212b, the first lead 231, and the second lead 232, thereby improving performance of the secondary battery.

[Third Invention]

Electrode Assembly According to an Embodiment of Third Invention

Figure 16:
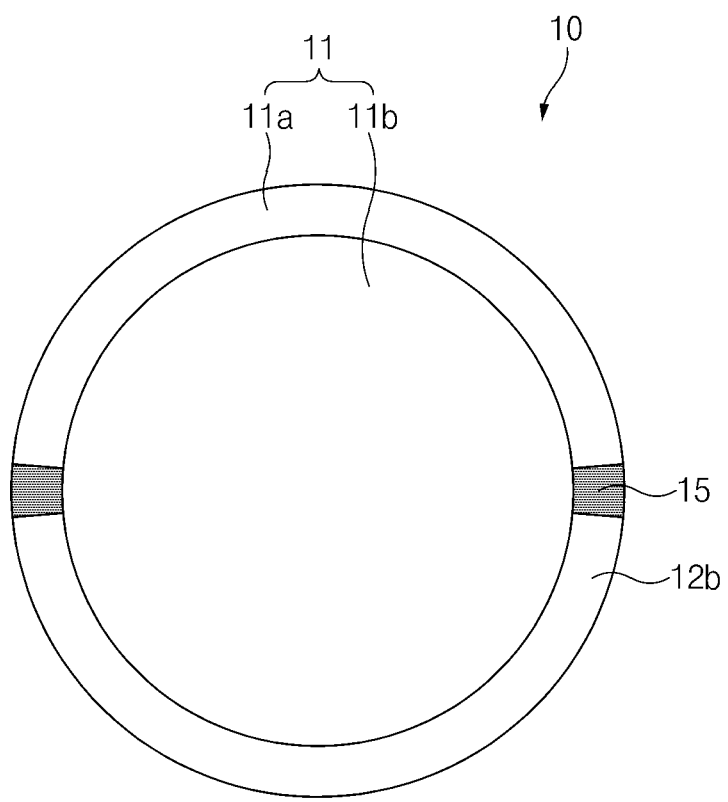
FIG. 16 is a plan view of an electrode assembly according to an embodiment of a third invention.

As illustrated in FIG. 16, an electrode assembly 10 according to an embodiment of a third invention comprises a blocking part 15 disposed between an end of a first non-coating portion 11b and an end of a second non-coating portion 12b. The blocking part 15 blocks the first non-coating portion 11b and the second non-coating portion 12b so that the first non-coating portion 11b and the second non-coating portion 12b do not contact each other.

That is, when each of the first non-coating portion 11b and the second non-coating portion 12b has a large arc angle, the end of the first non-coating portion 11b and the end of the second non-coating portion 12b may contact each other to cause short circuit. To prevent the short circuit from occurring, the blocking part 15 is disposed between the end of the first non-coating portion 11b and the end of the second non-coating portion 12b to prevent the end of the first non-coating portion 11b and the end of the second non-coating portion 12b from contacting each other, thereby preventing the short circuit from occurring.

Here, both surfaces of the blocking part 15 may be fixed to the end of the first non-coating portion 11b and the end of the second non-coating portion 12b, which face each other, respectively, to improve fixing force of the blocking part 15, particularly, preventing the end of the first non-coating portion 11b and the end of the second non-coating portion 12b from moving, thereby improving stability.

The blocking part 15 may be made of a semiconductor material. As a result, the blocking part may have an insulating property or is changed into a conductor according to a change in temperature of the first non-coating portion 11b and the second non-coating portion 12b to connect the first non-coating portion 11b to the second non-coating portion 12b or block the connection between the first non-coating portion 11b and the second non-coating portion 12b.

That is, when the blocking part 15 that is made of the semiconductor material is below a set temperature, the blocking part 15 may have the insulating property to block the connection between the end of the first non-coating portion 11b and the end of the second non-coating portion 12b. Also, when the blocking part 15 is above the set temperature, the blocking part 15 may be changed into the conductor to allow current to flow through the end of the first non-coating portion 11b and the end of the second non-coating portion 12b and thus to cause short circuit in early stages, thereby restricting an increase in temperature of the electrode assembly 10 and preventing ignition or explosion from occurring.

The semiconductor material may form a phase change material that is changed from an insulator to a conductor, and the phase change material of a first semiconductor material may be germanium or silicon. That is, germanium or silicon is a semiconductor, has four electrons, and has a characteristic of moving electrons at a predetermined temperature.

Here, the set temperature may range from about 60° C. to about 80° C. Preferably, the set temperature may be about 80° C. That is, in the electrode assembly 10, a change (i.e., contraction) of the separator 13 may occur at a temperature of about 60° C. to about 80° C. Thus, when the set temperature is set to a temperature of about 60° C. to about 80° C., the temperature of the electrode assembly 10 may be prevented from rising above about 60° C. to about 80° C. to prevent the separator 13 from being changed, thereby preventing the ignition or explosion from occurring.

Thus, the electrode assembly 10 according to an embodiment of the third invention may comprise the blocking part 15 between the end of the first non-coating portion 11b and the end of the second non-coating portion 12b to prevent the ignition or explosion from occurring.

Electrode Assembly According to Another Embodiment of Third Invention

Figure 17:
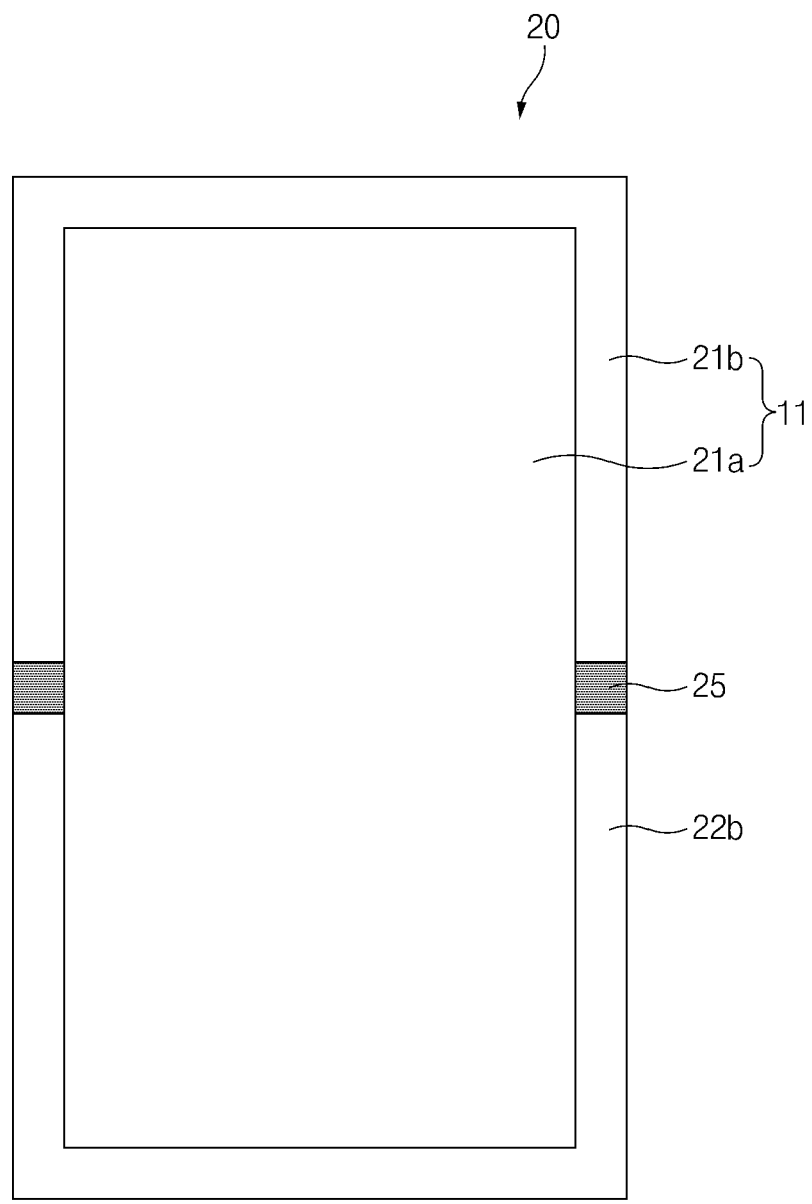
FIG. 17 is a plan view of an electrode assembly according to another embodiment of the third invention.

As illustrated in FIG. 17, an electrode assembly 20 according to another embodiment of a third invention comprises a blocking part 25 disposed between an end of a first non-coating portion 21b and an end of a second non-coating portion 22b. The blocking part 25 blocks the first non-coating portion 21b and the second non-coating portion 22b so that the first non-coating portion 21b and the second non-coating portion 22b do not contact each other.

The blocking part 25 has the same function as the blocking part described according to the foregoing embodiment of the third invention, and thus, detailed description thereof will be omitted.

Therefore, the electrode assembly 20 according to another embodiment of the third invention comprise the blocking part 25 between the end of the first non-coating portion 21b and the end of the second non-coating portion 22b to prevent the ignition or explosion from occurring.

EXPERIMENTAL RESULTS

Manufacturing Example 1

A secondary battery comprising an electrode provided with a non-coating portion having an arc shape is prepared. That is, the secondary battery that is the same as the secondary battery 100 according to still another embodiment of the first invention may be prepared, and then, temperatures of the secondary battery before and after the secondary battery is charged are measured. Here, temperatures of a first non-coating portion, a second non-coating portion, and a coating portion of the secondary battery are measured.

Comparative Example 1

A secondary battery comprising an electrode provided with a non-coating portion having a straight-line shape as shown in FIG. 18 is prepared. That is, in the secondary battery 100 according to still another embodiment of the first invention, the secondary battery comprising the electrode in which only the non-coating portion has a straight-line shape is prepared, and then, temperatures of the secondary battery before and after the secondary battery is charged are measured. Here, temperatures of a first non-coating portion, a second non-coating portion, and a coating portion of the secondary battery are measured.

Experimental Example

As a result of measuring the temperatures according to Manufacturing Example 1 and Comparative Example 1, measurement results as illustrated in FIG. 18 were obtained.

That is, in Manufacturing Example 1, the temperatures of the first non-coating portion, the coating portion, and the second non-coating portion before the secondary battery is charged were about 25.66° C., about 25.74° C., and about 25.53° C., and the temperatures of the first non-coating portion, the coating portion, and the second non-coating portion after the secondary battery is charged were about 28.48° C., about 30.03° C., and about 27.49° C.

In summary, it may be seen that, after the charging is completed, the first non-coating portion has a temperature has risen of about 2.82° C., and the second non-coating portion has a temperature has risen of about 1.96° C.

That is, in Comparative Example 1, the temperatures of the first non-coating portion, the coating portion, and the second non-coating portion before the secondary battery is charged were about 24.83° C., about 24.78° C., and about 24.80° C., and the temperatures of the first non-coating portion, the coating portion, and the second non-coating portion after the secondary battery is charged were about 30.60° C., about 30.08° C., and about 28.64° C.

In summary, it may be seen that, after the charging is completed, the first non-coating portion has a temperature has risen of about 5.77° C., and the second non-coating portion has a temperature has risen of about 3.84° C.

Therefore, when comparing Manufacturing Example 1 to Comparative Example 1, it may be confirmed that heat of the first and second non-coating portions is reduced after the charging is completed in Manufacturing Example 1 when compared to Comparative Example 1, and it may be expected that the resistance generated in the first and second non-coating portions is reduced.

The electrode according to the present invention may effectively increase in area to significantly reduce the resistance and heat, which are generated in the non-coating portion, thereby improving the performance of the battery.

The electrode assembly according to the present invention may comprise the electrode having the increasing area to reduce the resistance and heat, which are generated in the electrode assembly, thereby improving the performance of the electrode assembly.

The secondary battery according to the present invention may comprise the electrode assembly provided with the electrode having the increasing area to reduce the resistance and heat, which are generated in the electrode assembly, thereby improving the performance of the electrode assembly.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

What is claimed is:

1. An electrode assembly comprising first and second electrodes stacked in a stacking direction with a separator therebetween,
    wherein the first electrode comprises a first coating portion having a circular shape and coated with a first electrode active material and a first non-coating portion having an arc shape at a side of the first coating portion without being coated with the first electrode active material, and
    wherein the second electrode comprises a second coating portion having a circular shape and coated with a second electrode active material and a second non-coating portion having an arc shape at a side of the second coating portion without being coated with the second electrode active material,
    wherein the first non-coating portion and the second non-coating portion are not overlapped in the stacking direction.

2. The electrode assembly of claim 1, wherein each of the first non-coating portion and the second non-coating portion has an arc angle of 90° or more.

3. The electrode assembly of claim 2, wherein the arc length of each of the first non-coating portion and the second non-coating portion is 170° or less.

4. The electrode assembly of claim 1, wherein the first non-coating portion and the second non-coating portion have the same arc angle.

5. The electrode assembly of claim 1, wherein a blocking part configured to block the first non-coating portion and the second non-coating portion so that the first non-coating portion and the second non-coating portion do not contact each other is disposed between an end of the first non-coating portion and an end of the second non-coating portion.

6. The electrode assembly of claim 5, wherein the end of the first non-coating portion and the end of the second non-coating portion are fixed to opposing surfaces of the blocking part, respectively.

7. The electrode assembly of claim 5, wherein the blocking part is made of a semiconductor material, and
the semiconductor material has an insulating property at a temperature less than a set temperature to block connection between the end of the first non-coating portion and the end of the second non-coating portion and is changed into a conductor at a temperature greater than the set temperature to allow current to flow through the end of the first non-coating portion and the end of the second non-coating portion.

8. The electrode assembly of claim 7, wherein the set temperature ranges from 60° C. to 80° C.

9. A secondary battery comprising:
the electrode assembly of claim 1;
a case configured to accommodate the electrode assembly; and
a lead member comprising a first lead coupled to the first non-coating portion provided in the first electrode and having an end led out of the case and a second lead coupled to the second non-coating portion provided in the second electrode and having an end led out of the case.

10. The secondary battery of claim 9, wherein the first non-coating portion and a coupling surface of the first lead have the same arc angle, and
the second non-coating portion and a coupling surface of the second lead have the same arc angle.

11. An electrode assembly comprising first and second electrodes stacked in a stacking direction with a separator therebetween,
wherein the first electrode comprises a first coating portion coated with a first electrode active material and a ⊏-shaped first non-coating portion without being coated with the first electrode active material disposed at one side of the first coating portion, wherein the ⊏-shaped first non-coating portion contacts an edge at an end of the first coating portion and contacts both side edges of the first coating portion connected to the edge at the end, and
wherein the second electrode comprises a second coating portion coated with a second electrode active material and a ⊏-shaped second non-coating portion without being coated with the second electrode active material disposed at one side of the second coating portion, wherein the ⊏-shaped second non-coating portion contacts and edge at and end of the second coating portion and contacts both side edges of the second coating portion connected to the edge at the end of the second coating portion,
wherein the first non-coating portion and the second non-coating portion are not overlapped in the stacking direction.

12. The electrode assembly of claim 11, wherein the first non-coating portion and the second non-coating portion have the same size.

13. An electrode assembly comprising first and second electrodes stacked in a stacking direction with a separator therebetween,
wherein the first electrode comprises a first coating portion coated with a first electrode active material and a ⊏-shaped first non-coating portion disposed on an end at a side of the first coating portion and both side ends of the first coating portion contacting the end without being coated with the first electrode active material, and
wherein the second electrode comprises a second coating portion coated with a second electrode active material and a ⊏-shaped second non-coating portion disposed on an end at a side of the second coating portion and both side ends of the second coating portion contacting the end of the second coating portion without being coated with the second electrode active material,
wherein the first non-coating portion and the second non-coating portion are not overlapped in the stacking direction,
wherein a blocking part configured to block the first non-coating portion and the second non-coating portion so that the first non-coating portion and the second non-coating portion do not contact each other is disposed between the end of the first non-coating portion and the end of the second non-coating portion.

14. The electrode assembly of claim 13, wherein the end of the first non-coating portion and the end of the second non-coating portion are fixed to opposing surfaces of the blocking part, respectively.

15. The electrode assembly of claim 13, wherein the blocking part is made of a semiconductor material, and
the semiconductor material has an insulating property at a temperature less than a set temperature to block connection between the end of the first non-coating portion and the end of the second non-coating portion and is changed into a conductor at a temperature greater than the set temperature to allow current to flow through the end of the first non-coating portion and the end of the second non-coating portion.

16. A secondary battery comprising:
the electrode assembly of claim 11;
a case configured to accommodate the electrode assembly; and
a lead member comprising a first lead coupled to the first non-coating portion provided in the first electrode and having an end led out of the case and a second lead coupled to the second non-coating portion provided in the second electrode and having an end led out of the case.

17. The secondary battery of claim 16, wherein the first non-coating portion and a coupling surface of the first lead, which are coupled to each other, have the same '⊏' shape, and
the second non-coating portion and a coupling surface of the second lead, which are coupled to each other, have the same '⊏' shape.

* * * * *